United States Patent Office 3,803,210
Patented Apr. 9, 1974

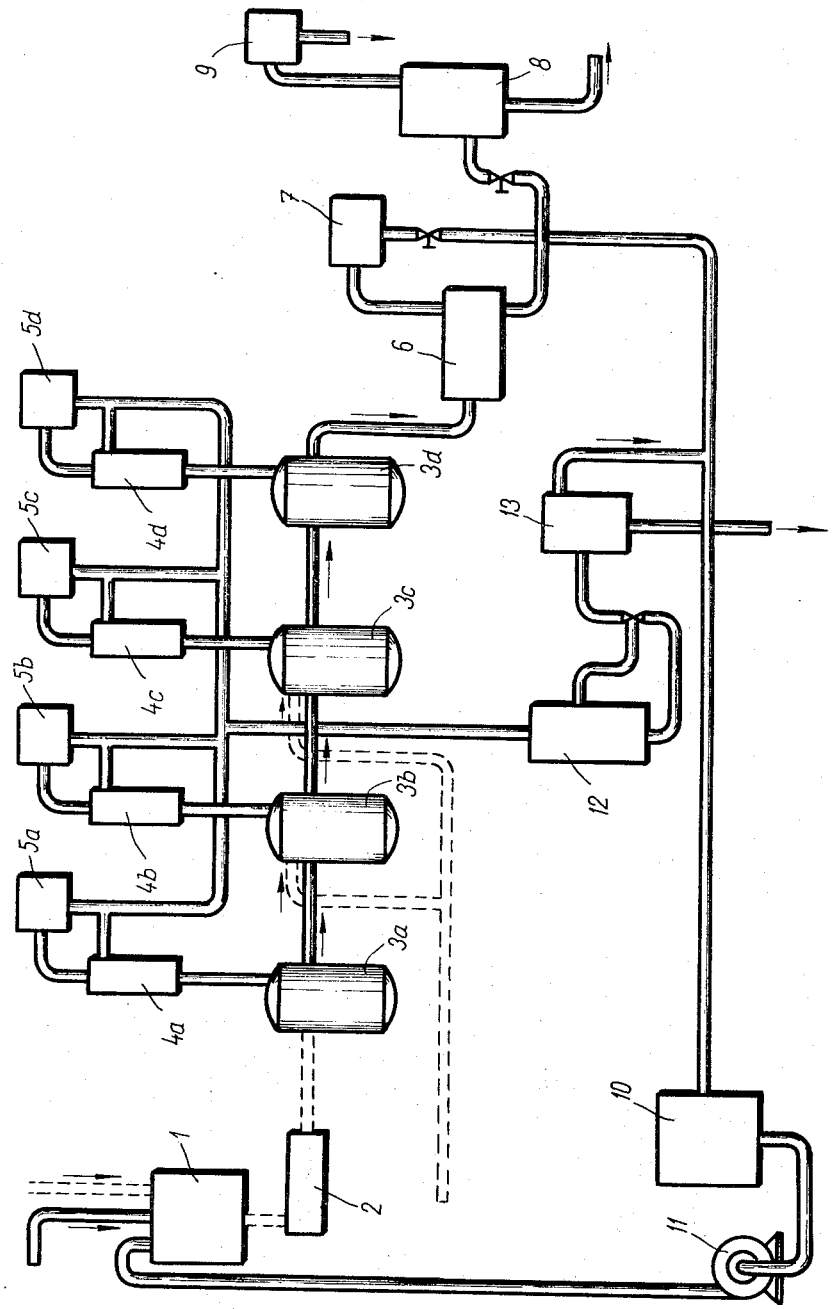

3,803,210
METHOD OF ESTERIFYING BENZENE CARBOXYLIC ACID BY ETHYLENE GLYCOL
Vladimir Rod, Zdenek Sir, and Vladimir Bazant, Prague, and Ludmila Strnadova, Horovice, Czechoslovakia, assignors to Ceskoslovenska Akademie Ved, Prague, Czechoslovakia
Filed May 27, 1971, Ser. No. 147,329
Claims priority, application Czechoslovakia, June 1, 1970, 382,470
Int. Cl. C07c 69/82
U.S. Cl. 260—470
5 Claims

ABSTRACT OF THE DISCLOSURE

Method of catalyzed esterification of benzene carboxylic acids, such as terephthalic acid, or mixtures thereof with other aromatic, aliphatic and alicyclic carboxylic acids used as modifying additives in the preparation of polyester fibers, wherein to a mixture of terephthalic acid or to a mixture of acids containing an appropriate amount of an esterification catalyst and an inert diluent, which mixture is heated to the boiling temperature under atmospheric or superatmospheric pressure, ethylene glycol is added successively or continuously so as to ensure a low concentration of free glycol in the reaction mixture during the reaction and a substantially constant reaction rate.

BACKGROUND OF THE INVENTION

The present invention relates to a method of catalyzed esterification of benzene carboxylic acids, such as terephthalic acid, and of derivatives thereof by ethylene glycol in the presence of an esterification catalyst, wherein the formation of glycol condensation products, such as, for example, diethylene glycol, is reduced and suppressed.

It is known, that an important by-product in the preparation of polyester fibers is polyethylene terephthalate prepared by a polycondensation of glycol esters of terephthalic acid. These glycol esters of terephthalic acid are prepared either by reesterifying dimethyl terephthalate or by direct esterification of terephthalic acid by ethylene glycol. There are certain properties of the polycondensate, such as, for instance, average molecular weight, distribution of molecular weights, content of carboxyl, of methyl and of aliphatic, as well as phenolic hydroxyl end groups, content of diglycol terephthalate oligomers and last but not least the presence or content of oligomers of ethylene glycol itself, which are of great importance in view of the polyester fiber quality. In estimating the quality of the polycondensate and of the polyester fiber, a great stress is laid on the content of polyethylene glycols, although in the process practically diethylene glycol only arises. In this respect, it is important that diethylene glycol formed during the re-esterification of terephthalic acid cannot be removed from the reaction mixture during the polycondensation. On the other hand, it is formed during the polycondensation of diglycol terephthalate or of lower oligomers thereof, although to a small extent.

If the ester mixture, to be used for the preparation of polycondensate contains diethylene glycol, then the produced fiber will contain the corresponding amount thereof and the fiber characteristics will unfavorably be influenced. It is known that increasing diethylene glycol content impairs all physical properties of polyester fibers, particularly its tensile strength and resistance to abrasion, as well as uniformity of coloration by dyes and fastness thereof if exposed to sunlight and to detergents.

Since the diethylene glycol is formed particularly during the preparation of glycol esters of terephthalic acid from dimethyl terephthalate or from free acid, it is necessary to select suitable conditions of re-esterification or direct esterification. It is believed that in the esterification of terephthalic acid or in the re-esterification of dimethyl terephthalate by ethylene glycol, diethylene glycol can arise as the product of two secondary reactions, i.e. either by direct condensation of two glycol molecules (1) or by a reaction between free glycol and ester thereof (2).

$$2HOC_2H_4OH = HOC_2H_4OC_2H_4OH + H_2O \quad (1)$$

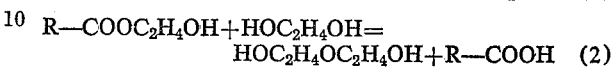

$$R-COOC_2H_4OH + HOC_2H_4OH =$$
$$HOC_2H_4OC_2H_4OH + R-COOH \quad (2)$$

Further it is known that the above two reactions are catalyzed, on the one hand, by free carboxyl groups in a solution, and, on the other hand, to greater or lesser extent by all the catalysts used in the re-esterification of dimethyl terephthalate or in the direct esterification of terephthalic acid by ethylene glycol. Diethylene glycol formed as the product of the aforementioned reactions reacts further with free carboxylic groups as well as with carboxymethyl groups in the formation of diethylene glycol esters which later, during the succeeding polycondensation, are incorporated into the macromolecular polyester chain.

Since, particularly in the direct esterification of terephthalic acid by ethylene glycol, the enhanced formation of diethylene glycol cannot be avoided, conditions have been sought, wherein the secondary reactions of ethylene glycol are reduced to the minimum. It has been proposed to carry out the esterification at an elevated temperature and under superatmospheric pressure in order to accelerate the esterification reaction since the speed of the diethylene glycol formation, rises at a slower rate with the temperature increase than the esterification speed. Further it has been proposed to use in the esterification a smaller amount of glycol than that which would correspond to the diglycol terephthalate, such as, for example, from 1.2 to 1.8 mole of ethylene glycol per one mole of terephthalic acid, which amount corresponds to the formation of oligomers $HOC_2H_4/OCOC_6H_4COOC_2H_4/_nOH$, wherein $n$ equals 2–7, and whereby by reducing the amount of ethylene glycol in liquid phase, the formation of diethylene glycol will be decelerated; on the hand, where the melt of arising esters is used as the liquid reaction medium it is unnecessary to remove the non-reacted glycol after the esterification. Moreover it has been proposed, as disclosed in French patent specification No. 1,546,083, to add to the reaction mixture a suitable base, such as, for instance, an organic amine, to reduce the acidity of the reaction mixture. In accordance with another method as referred to in Czechoslovak patent specification No. (Czech. patent application No. 4,906/66) which is suitable especially for a continuous process, free terephthalic acid and free glycol do not come in contact with each other during the entire process of preparing polyethylene terephthalate since glycol is dosed into one of the last cascade stages containing the oligomer melt having an average value where $n=7$ so that by glycolysis the polycondensation degree is reduced to $n=3$ and a portion of the glycolyzed mixture is led to the first stage cascade into which such an amount of terephthalic acid is added so as to give rise again to the oligomer mixture having a polycondensation degree where $n=7$. All the aforementioned modifications of the esterifying process take advantage of an elevated temperature and superatmospheric pressure. Likewise, attention has been paid to the choice of catalyst. Since the reaction mixture for esterification, prepared from terephthalic acid and a small amount of ethylene glycol, contains but a small portion in liquid phase and is, consequently poorly stirrable, apart from the inconvenient properties in regard to the heat transfer, it has been proposed to add to the mixture a suitable inert diluent, such as, for example, chlorobenzene, ethers, or ketones, which during or after the esterification are separated from the reaction mixture by distilling off (see Japanese patent specifications Nos. 43/1,629/68 and 43/15,639/68).

By the modifications of conditions of esterification of the terephthalic acid by ethylene glycol, as hereinbefore referred to, there has been attained a substantial reduction in the formation of diethylene glycol as compared with the method wherein the esterification is effected under atmospheric pressure and at room temperature with ethylene glycol in excess; however, the polycondensate so formed is still yet rather contaminated with diethylene glycol. In the case of the method as disclosed in the invention of the firm Teijin (Czechoslovak patent application No. Pv 4,906/66) this is caused by the fact that by recycling a portion of the reaction mixture from the last stage of the esterifying cascade back into the first one, the mean residence time is extended so that the reaction (2) can come into play to a greater extent. With the other methods the totally used glycol amount immediately comes in contact with a large excess of terephthalic acid so that the reactions (1) and (2) can be catalytically influenced by free carboxyl groups.

It is therefore an object of the present invention to provide a method of esterifying benzene carboxylic acids and derivatives thereof by ethylene glycol, which method may be carried out in a simple and economical manner and which is not subject to the above discussed difficulties and disadvantages.

SUMMARY OF THE INVENTION

In accordance with the invention there is provided a method of catalytically esterifying benzene carboxylic acids and derivatives thereof, such as terephthalic acid, and/or in combination with other aromatic acids used as modifying additives in the preparation of polyester fibers, with ethylene glycol, and wherein the carboxylic acid is suspended under agitation in an inert diluent which remains under the conditions in a liquid state therefore stable, and not liable to react with any of the reaction mixture constituents and in which all the constituents are only parially soluble, in inert solution such as, for example, Decalin or Tetralin and whereupon ethylene glycol when added to the suspension, either continuously or in small doses, at the boiling temperature of the suspension and under atmospheric or superatmospheric pressure so as to prevent a molar ratio of free ethylene glycol in the reaction mixture to the total amount of free acid and the esters thereof from exceeding the value of 1.0, and to keep it preferably within the range of from 0.05 to 0.20, the reaction water, which may contain a certain portion of the diluent, is continuously distilled off, and the remnants of the inert diluent, having been removed after settling the phases, is completely distilled off.

The reaction mixture residue left after the distillation is then subject to a process of polycondensation which can be catalyzed by a catalyst such as antimonous acetate, and stabilized by a material such as tris-nonylphenyl phosphite.

According to another feature of the present invention the method is effected at a temperature of from 200 to 270° centigrades and under a superatmospheric pressure varying within the range of from 4 to 6 atm., and the esterification process is catalyzed by cobaltous or manganous acetate.

According to still other feature of the invention the inert diluent is dosed into the suspension in a weight ratio ranging from 0.5:1 to 4:1, with respect to the amount of the esterified acid.

Finally, a feature of the invention resides in that the total glycol amount entering the reaction corresponds to an equivalent ratio of from 0.6 to 0.9, with respect to the total amount of carboxyl groups present, a portion of glycol together with the diluent being used for the preparation of the suspension of the acid to be esterified.

BRIEF DESCRIPTION OF THE DRAWING

The accompanying drawing shows a schematic flowsheet of an illustrative plant proposed for carrying out the aforediscussed method in practice, the plant being hereinafter described with reference to said drawing in the appended Example VII.

DESCRIPTION OF THE PREFERRED EMBODIMENTS

The gist of the above-described method resides in the fact that the reacting mixture contains at the beginning only a small amount of reacting substances in liquid phase and which phase is constituted by the saturated terephthaltic acid solution and the total amount of the esterification catalyst in boiling glycol. Since the volume ratio of free glycol to terephthalic acid is so low that the reaction (2) cannot proceed, there is formed only a small amount of diethylene glycol, relative to the amount of terephthalic acid according to reaction (1). In this stage of the process the liquid phase volume in which the esterification reaction proceeds, is small in respect to the total volume of the esterified acid. However the reaction is here accelerated by a high concentration of the catalyst in liquid phase so that even under the aforementioned conditions the reaction proceeds at a sufficient rate. The inert diluent is to be selected so as to not enter into reaction with any of the reaction mixture constituents or reaction products and further to be stable under reaction conditions, as well as only partially miscible with the reaction products, and as to have such a boiling point so as to ensure the possibility of the separation thereof from the reaction mixture by distilling while simultaneously permitting the attainment of a reaction temperature of from 200 to 250° centigrades without it being necessary to use enormous pressures. The density and the viscosity of the inert diluent should preferably enable it to be previously separated from the reaction mixture by gravity sedimentation. The inert diluent liquefies the mixture in the first reaction stage, enables it to be fairly miscible, improves the heat transfer from the walls of the reaction vessel into the mixture and facilitates the separation of the reaction water from the esterification mixture. These properties and others which the inert diluent must exhibit, are complied with by pure Decalin (decahydronaphthalene) freed by preliminary refining from all remnants of both carbonyl and aromatic compounds. During the esterification reaction the amount of liquid phase mass increases. This mass is constituted by a terephthalic acid solution in the reaction product melt. Since the concentration of free ethylene glycol in the reacting liquid phase is kept, by an appropriately programmed dosage, at a low level, and since the rate of the esterification reaction is substantially higher than that of the reactions (1) and (2), a significant rise of the diethylene glycol content will not occur even in this reaction phase.

By using the method according to the present invention in the esterification of terephthalic acid, wherein the molar ratio of reacting substances is made equal to 1.5:1, it is possible if using standard polycondensation technique, to prepare a polycondensate suitable for manufacturing fibers and which contains less than one percent of diethylene glycol, i.e. practically from 0.5 to 0.6 percent.

The following examples are given as illustrative only, without, however, limiting the invention to the specific details thereof.

EXAMPLE I

In a batch esterifying apparatus comprising a pressure vessel of 3.6 liter capacity equipped with an agitator and a heated jacket, a pressure feeder, a rectifying column, and a vacuum pump, a mixture of 1000 grams (6.02 mole) of terephthalic acid and 932 grams (15.05 mole) of ethylene glycol in the presence of an esterification catalyst (0.14 gram of cobaltous acetate and 0.38 gram of manganous acetate) was heated. The apparatus was kept under a superatmospheric pressure of from 4 to 6 kp./sq. cm. as to ensure the rise of the reaction mixture temperature during the esterification from 220 to 250° centigrades while the temperature of vapor at the top of the column was being kept within the range of from 135 to 150° centigrades so that the water formed in the reaction was separated by distillation. After 3 hours, when the degree of conversion of free carboxylic groups to ester groups had attained 91.5 percent, the pressure in the apparatus was slowly reduced to the atmospheric level, the excess of non-reacted ethylene glycol having been simultaneously distilled off. The reaction mixture, after a polycondensation catalyst (0.65 gram of antimonous acetate) and a stabilizing agent (2.5 gram of trisnonylphenyl phosphite) had been added thereto, was subject to polycondensation under usual conditions and finally at the temperature of 280° centigrades and under vacuum of 0.5 torr, and then extruded in string form into aqueous bath. There were obtained 1150 grams of polycondensate chips of greenish color characterized by the following values; melting point of 254° centigrades; intrinsic viscosity of 0.770; acidity of 55 gram-equivalent/ton; 2.90 percent diethylene glycol content.

EXAMPLE II

In the esterifying apparatus as above-described in Example I a mixture of 1000 grams (6.02 mole) of terephthalic acid, 560 grams (9.03 mole) of ethylene glycol and 530 grams of Decalin were heated in the presence of the same amount of the esterification catalyst and under the same conditions as referred to in Example I. During the esterification a portion of Decalin was leaving the column together with the total amount of water. After 3 hours, when 91.5 percent conversion of carboxyl groups had been reached, the reaction mixture was subjected to polycondensation as referred to in Example I. There were obtained 1100 grams of polycondensate chips of greenish color, characterized by the following values: melting point 257° centigrades; intrinsic viscosity 0.810; acidity 42 gram-equivalent; diethylene glycol content 1.77 percent.

EXAMPLE III

In the same apparatus as described in Example I a mixture of 1000 grams (6.02 mole) of terephthalic acid, 140 grams (2.26 mole) of ethylene glycol and 530 grams of Decalin were heated in the presence of the same amount of the esterification catalyst as referred to in Example I under superatmospheric pressure of 5 kp./sq. cm. up to the boiling point. Into the reaction flash another 420 grams (6.77 mole) of ethylene glycol were placed. After 30 minutes a continuous uniform dosage of this additional glycol portion was started at such a speed as to empty total feeder capacity within 90 minutes. After another 30 minutes 93.5 percent carboxyl conversion was reached and the reaction mixture was subject to polycondensation as referred to in Example I. The yield was 1120 grams of polycondensate chips of the same color as in Examples I and II, characterized by melting point of 261° centigrades, intrinsic viscosity of 0.785, acidity of 22 gram-equiv./ton and 0.68 percent diethylene glycol content.

EXAMPLE IV

In the esterifying apparatus described in Example I a mixture of 900 grams (5.4 mole) of terephthalic acid, 100 grams (0.6 mole) of isophthalic acid, 560 grams (9.03 mole) of ethylene glycol and 530 grams of Decalin was heated in the presence of the same amount of the esterification catalyst and under the same conditions as referred to in Example I. After 3 hours 93.5 percent conversion of carboxyl groups was reached whereupon the reaction mixture was subjected to polycondensation under the same condition as referred to in Example I. There were obtained 1090 grams of polycondensate chips having melting point of 237° centigrades, intrinsic viscosity of 0.720, acidity of 42 grams-equiv./ton and diethylene glycol content of 1.86 percent by weight.

EXAMPLE V

A mixture of 900 grams (5.4 mole) of terephthalic acid and 100 grams (0.6 mole) of isophthalic acid was subject to esterification in the same manner as described to in Example III. After polycondensation of the esterification mixture there was obtained 1125 grams of the product having melting point of 240° centigrades, an intrinsic viscosity of 0.735, an acidity of 31 gram-equiv./ton and a diethylene glycol content of 0.84 percent by weight.

EXAMPLE VI

A mixture of 900 grams (5.4 mole) of terephthalic acid and 29 grams (0.104 mole) of sodium (S) salt of 5-sulphoisophthalic acid was subject to esterification in the same manner as in Example III. After polycondensation of the esterification mixture there was obtained 1010 g. of the product having melting point of 256° centigrades, intrinsic viscosity of 0.712, acidity of 25 gram-equiv./ton and diethylene glycol content of 0.71 percent by weight.

EXAMPLE VII

In the following example reference is made to a continuous esterifying apparatus of the cascading multiple stage type. Referring to the accompanying schematic drawing comprising such a plant may comprise four pressure vessels 3a, 3b, 3c and 3d of 16 liters capacity each, each of which being provided with an agitator, a heating jacket, and corresponding columns 4a, 4b, 4c and 4d, and condensers 5a, 5b, 5c and 5d. In accordance with this example the first stage 3a was supplied by means of a pump 2 with 6.7 kgs./hr. of a suspension previously prepared in a mixer 1 from materials fed into it of the following amounts 3.0 kgs./hr. of terephthalic acid, 2 kgs./hr. of Decalin, 0.6 kg./hr. ethylene glycol, 0.50 g./hr. of colbaltous acetate and 1.35 g./hr. of manganous acetate. The pressure in all the cascade stages as well as in a settling tank 6 was kept at substantially on the value of 6 atm. while the average temperatures in the individual stages amounted to 234, 240, 248 and 256° centigrades, respectively. Under these conditions there was dosed into the second stage 3b 0.6 kg./hr. of glycol, and into the third stage 3c 0.5 kg./hr. of glycol. The vapor temperature at the top of the columns 4a, 4b, 4c and 4d was kept by reflux at a value of from 155 to 160° centigrades, and the distillation was being effected in such a way that the distillate totaled to 0.65 kg./hr. of water containing from 2 to 3 percent of glycol, and 0.70 kg./hr. of Decalin were being withdrawn. Under these conditions the carboxyl conversion in the mixture in the fourth cascade stage reached the value of from 93 to 95 percent and the diethylene glycol content varied within the range of from 0.4 to 0.6 percent. The reaction mixture from the fourth stage 3d was introduced into the heat-insulated settling tank 6 of 12 liters capacity from which the upper Decalin layer in the amount of 1.2 kg./hr. was withdrawn via a cooler 7 and a valve automatically controlled in accordance with the inter-phase level, into a Decalin storage tank 10. The distillate collected from the condensers 5a, 5b, 5c and 5d was recaptured under pressure in a reservoir 12 and therefrom introduced into a non-pressure separating vessel 13, wherefrom the upper Decalin layer was overflowing into the Decalin storage tank 10 while the lower aqueous layer was being led off to waste. The lower layer from the settling tank 6 was let out in the amount of 4.15 kgs./hr. through a throttle valve into a non-pressure vessel 8, provided with a condenser 9 from which the raw material for batch polycondensation was being withdrawn. Products have been obtained, having melting point of from 257 to 261° centigrades, intrinsic viscosity of from 0.70 to 0.95, end carboxyl group content of from 17 to 30 gram-equiv./ton, and diethylene glycol content of from 0.5 to 0.8 percent by weight.

Without further analysis, the foregoing will so fully reveal the gist of the present invention that others can by applying current knowledge readily adapt it for various applications without omitting features that, from the standpoint of prior art fairly constitute essential characteristics of the general or specific aspects of this invention and, therefore such adaptations should and are intended to be comprehended within the meaning and range of equivalence of the following claims.

What is claimed as new and desired to be protected by letters patent is set forth in the appended claims.

What is claimed is:

1. Method of esterifying (1) terephthalic acid and mixtures thereof with isophthalic acid or sodium salt of 5-sulphoisophthalic acid by ethylene glycol in the presence of catalyst to reduce the formation of glycol condensation products, comprising (a) preparing a suspension of component (1) in an inert diluent selected from the group consisting of Decalin and Tetralin in a weight ratio of about 0.5:1 to about 4:1 in respect to the amount of component (1) which remains under the esterification conditions liquid, stable, unable to react with any of the reaction mixture constituents, and in which all said constituents are only partially soluble; (b) adding ethylene glycol to said suspension at such a rate that the molar ratio of free ethylene glycol in the reaction mixture to the total amount of component (1) does not exceed 1.0; (c) simultaneously distilling off reaction water containing a portion of said inert diluent, from the reaction mixture; and (d) removing the remaining diluent from the reaction mixture after settling the phases, and completely distilling it therefrom.

2. Method according to claim 1, wherein the esterification is effected at a temperature of from 200 to 270° C. under atmospheric pressure.

3. Method as defined in claim 2, wherein the esterification is effected under a superatmospheric pressure of from 4 to 6 atm.

4. Method as defined in claim 1, wherein the amount of ethylene glycol employed in said reaction corresponds to an equivalent ratio from 0.6 to 0.9 in respect to the total amount of carboxyl groups present, and wherein a portion of said glycol together with said diluent is used for the preparation of the suspension of the acid to be esterified.

5. The method defined in claim 1 wherein the molar ratio of the ethylene glycol to component (1) is maintained within the range of 0.05 to 0.20.

References Cited
UNITED STATES PATENTS 3,427,287  2/1969  Pengilly _____ 260—475 P LORRAINE A. WEINBEGER, Primary Examiner E. JANE SKELLY, Assistant Examiner U.S. Cl. X.R.

260—75 S, 75 M, 475 P